3 Sheets—Sheet 1.
L. A. HAINES.
MOWING-MACHINE.
No. 173,943. Patented Feb. 22, 1876.
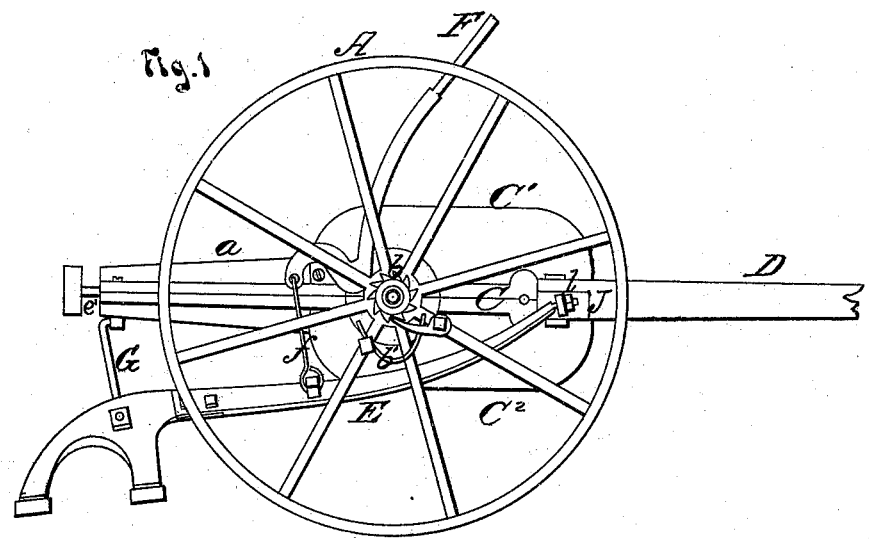
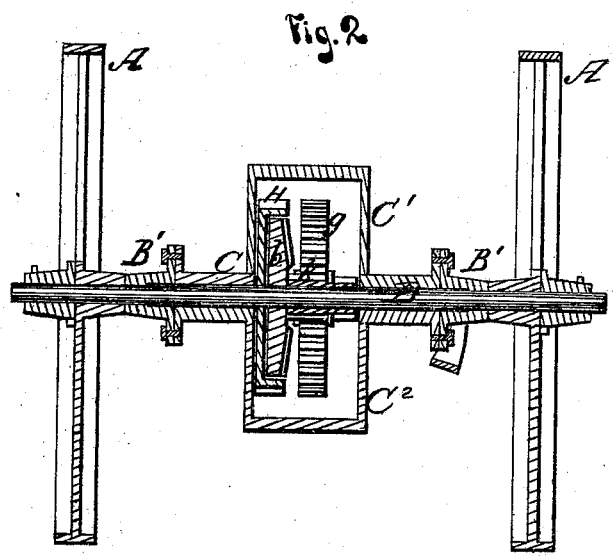
WITNESSES
George E. Upham.
Robert Everett.
INVENTOR
Lewis A. Haines
By Chipman Hosmer &c.
ATTORNEYS.

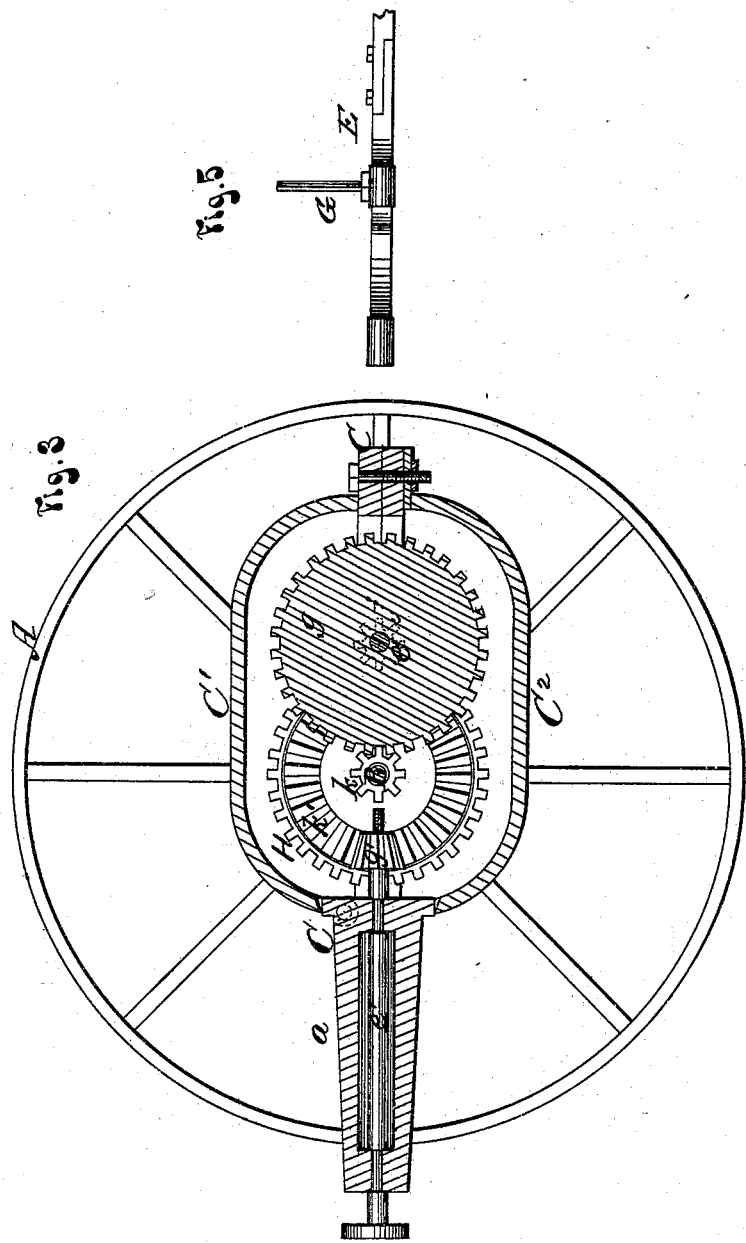

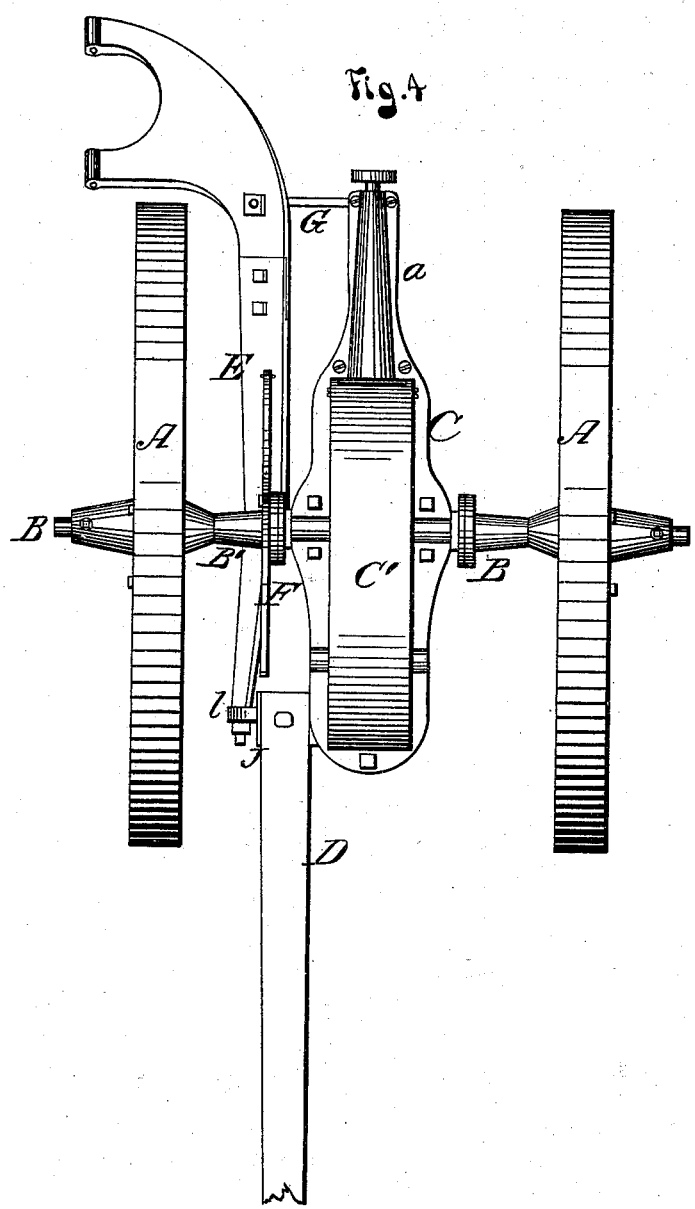

UNITED STATES PATENT OFFICE.

LEWIS A. HAINES, OF WAKEFIELD, MARYLAND, ASSIGNOR TO HIMSELF AND EDWARD LYNCH, OF SAME PLACE.

IMPROVEMENT IN MOWING-MACHINES.

Specification forming part of Letters Patent No. 173,943, dated February 22, 1876; application filed March 21, 1874.

*To all whom it may concern:*

Be it known that I, LEWIS A. HAINES, of Wakefield, in the county of Carroll and State of Maryland, have invented a new and valuable Improvement in Harvesters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my harvester. Fig. 2 is a transverse sectional, and Fig. 3 a longitudinal sectional, view of the same. Fig. 4 is a plan view.

This invention has relation to harvesting-machines having the cutting apparatus attached to a drag-bar, which is arranged between the driving and transporting wheels, and extended from the front part of the draft-frame in rear of the said wheels.

The nature of my invention consists in a draft-frame, which is composed of two horizontally-divided bearing-sections for the gearing which drives the sickle, in combination with housing-caps, which will inclose said gearing and allow free access to it; also, in side bearings for said frame and housing-caps, which bearings are so constructed and arranged as to throw all the weight of the frame on the ends of the axle of the driving and transporting wheels; also, in so constructing the gearing which actuates the sickle that the master-wheel, which is keyed on the main axle, will afford a side bearing for the intermediate bevel-wheel, which turns loosely on said axle, and prevent the teeth of this wheel or the teeth of its pinion from being broken.

In the annexed drawings, A A designate two transporting-wheels, which are applied on an axle, B, by means of ratchet-wheels $b$ and pawls $b'$, so that when the machine is drawn forward these wheels will turn the axle, but turn loosely around it when the machine is backed.

C designates the draft-frame, which is composed of two horizontally-divided portions, which are bolted together upon the axle B, and constructed to afford bearings for the shafts $e$ $e'$ of spur-wheels $g$ $g'$. The rear contracted part $a$ of the frame C affords end bearings for the shaft $e'$, and the front portion of this frame affords bearings for the shaft $e$ of the wheel $g$.

$B'$ $B'$ designate flanged hubs, which receive through them the axle B, and are rigidly bolted to flanges formed on the sides of frame C, as shown in Figs. 2 and 4. These hubs $B'$ $B'$ afford bearings for the frame C near the inner ends of the hubs of wheels A A.

By thus supporting frame C near the ends of its axle, this axle will not be liable to become bent by the weight upon it.

$C^1$ designates a housing-cap, which covers and protects the gear-wheels, and which is pivoted to the frame C, so that one end of it can be raised to obtain access to said wheels.

Beneath the frame is another housing, $C^2$, which also protects the gear-wheels, and which is removable, for the purpose of discharging anything which may collect in it.

H designates the master-wheel, which is keyed on the axle B inside of the frame C, and which communicates rotary motion to the shaft $e'$ through the medium of spur-wheels H, $j$, $g$, $k$, $k'$, and $g'$. The wheels $k$ $k'$ are rigidly secured together, and they turn loosely around the axle B. The wheel $k'$, which is a bevel-wheel, engages with the bevel-pinion $g'$ on shaft $e'$, and is recessed into one side of the master-wheel H, so as to have a bearing against this wheel.

By thus sustaining the wheel $k'$ its teeth, as well as those of the pinion $g'$, will not be liable to be broken.

J designates an angular bracket, which is bolted to the bottom of the frame C at its front end, and which has rigidly secured to it the draft-pole D. An eye, $l$, is secured to the upturned portion of the bracket J, to which eye the front swiveling end of the drag-bar E is attached. This bar extends downward and backward, and is attached to the portion $a$ of frame C by means of a joint-brace, G. By means of a hand-lever, F, which is connected to the bar E by a rod, $f$, this bar can be raised and depressed.

What I claim as new, and desire to secure by Letters Patent, is—

1. The centrally horizontally divided draft-frame sections C for the gearing which drives the sickle, and their recessed prolongations $a$, extended in the same plane, in combination with the upper and lower hinged housing-caps $C^1$ $C^2$, to allow free access to the gearing, constructed substantially as described.

2. The combination, with the draft-frame C, horizontally divided to receive the axle, and provided with flanges over and under the axle-seats, of the flanged hubs $B'$ $B'$, sleeved on said axle, and suitable connecting-bolts, substantially as specified.

3. The harvesting mechanism, consisting of the edge-toothed and laterally-recessed master-wheel H, fixed on the axle, and the double gears $g\,j$ on the counter-shaft $e$, the transverse sickle-pinion $g'$ on the crank-shaft, and the imbedded double gears $k\,k'$, loose on said axle and seated in the lateral recess of said master-wheel, all constructed and combined to operate together, substantially as described.

In testimony that I claim the above I have hereunto subscribed my name in the presence of two witnesses.

LEWIS A. HAINES.

Witnesses:
GEORGE E. UPHAM,
ROBERT EVERETT.